(12) United States Patent
Katsuda et al.

(10) Patent No.: US 10,036,478 B2
(45) Date of Patent: Jul. 31, 2018

(54) ELECTRONIC DEVICE, WEARABLE DEVICE, PRESSURE REGULATOR VALVE AND METHOD FOR MANUFACTURING PRESSURE REGULATOR VALVE

(71) Applicant: CASIO COMPUTER CO., LTD., Tokyo (JP)

(72) Inventors: Hiroshi Katsuda, Kodaira (JP); Hiroki Nishiyama, Fussa (JP); Akihisa Ohmura, Hachioji (JP); Akira Suzuki, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/194,783

(22) Filed: Jun. 28, 2016

(65) Prior Publication Data

US 2017/0002939 A1    Jan. 5, 2017

(30) Foreign Application Priority Data

Jul. 3, 2015  (JP) ................................. 2015-134195
May 31, 2016 (JP) ................................. 2016-108206

(51) Int. Cl.
| | | |
|---|---|---|
| *H04R 1/02* | (2006.01) | |
| *F16K 15/14* | (2006.01) | |
| *F16K 99/00* | (2006.01) | |
| *F16K 17/02* | (2006.01) | |
| *H04R 1/04* | (2006.01) | |
| *H04R 1/08* | (2006.01) | |

(52) U.S. Cl.
CPC ............ *F16K 15/147* (2013.01); *F16K 17/02* (2013.01); *F16K 99/0015* (2013.01); *H04R 1/04* (2013.01); *H04R 1/086* (2013.01); *F16K 2099/0078* (2013.01); *F16K 2099/0082* (2013.01); *H04R 2499/11* (2013.01)

(58) Field of Classification Search
CPC ... H04R 1/00; H04R 1/02; H04R 1/04; H04R 1/08; H04R 1/086; H04R 2499/11; F16K 15/00; F16K 15/14; F16K 15/147; F16K 17/00; F16K 17/02; F16K 99/00; F16K 99/0003; F16K 99/0015; F16K 2099/0074; F16K 2099/0078; F16K 2099/0082
See application file for complete search history.

(56) References Cited

U.S. PATENT DOCUMENTS 3,140,729 A * 7/1964 Mercier ................... F15B 1/18
                                                  137/513.3
6,192,253 B1 * 2/2001 Charlier ................. H04B 1/385
                                                  455/340

(Continued)

FOREIGN PATENT DOCUMENTS

JP    H05-172956 A    7/1993
JP    H06-027254 A    2/1994

(Continued)

*Primary Examiner* — Thang Tran
(74) *Attorney, Agent, or Firm* — Scully, Scott, Murphy & Presser, P.C.

(57) ABSTRACT

An electronic device includes a housing and an internal pressure regulator valve. The internal pressure regulator valve includes a valve body of flexible material. The valve body has a valve hole and a hollow. The hollow is continuous with the valve hole and opens into the housing. Through the valve hole, gas is released to outside.

17 Claims, 4 Drawing Sheets

(56) References Cited

U.S. PATENT DOCUMENTS

| | | | | |
|---|---|---|---|---|
| 6,528,203 | B1* | 3/2003 | Mitamura | H01M 2/1022 |
| | | | | 429/100 |
| 9,408,009 | B1* | 8/2016 | Witte | H04R 1/028 |
| 2008/0166625 | A1* | 7/2008 | Schembri | H01M 2/1205 |
| | | | | 429/53 |
| 2014/0133687 | A1* | 5/2014 | Lee | H04R 1/083 |
| | | | | 381/355 |
| 2016/0212526 | A1* | 7/2016 | Salvatti | H04R 1/44 |

FOREIGN PATENT DOCUMENTS

| | | | |
|---|---|---|---|
| JP | 2006041865 A | * | 2/2006 |
| JP | 2006-101505 A | | 4/2006 |

* cited by examiner

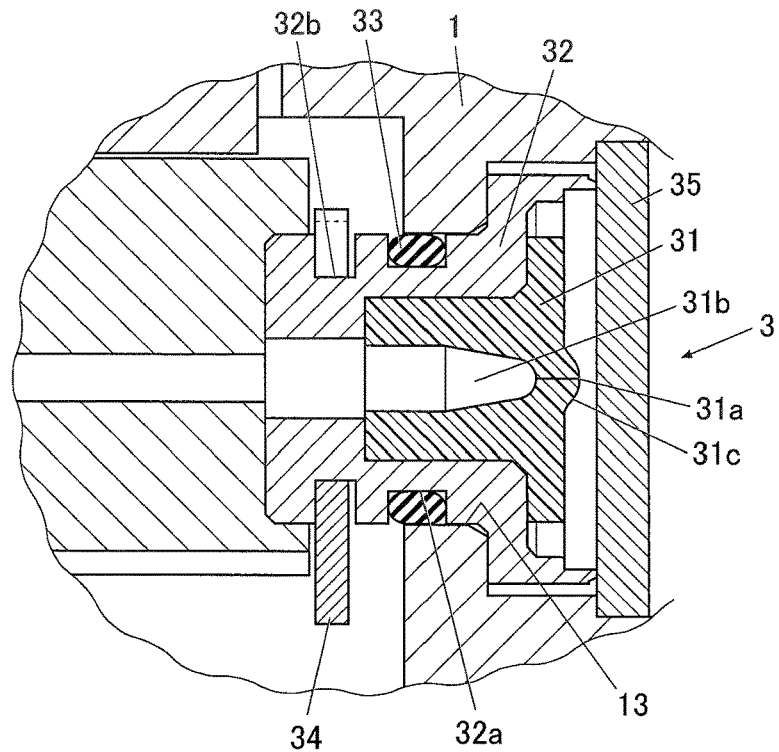
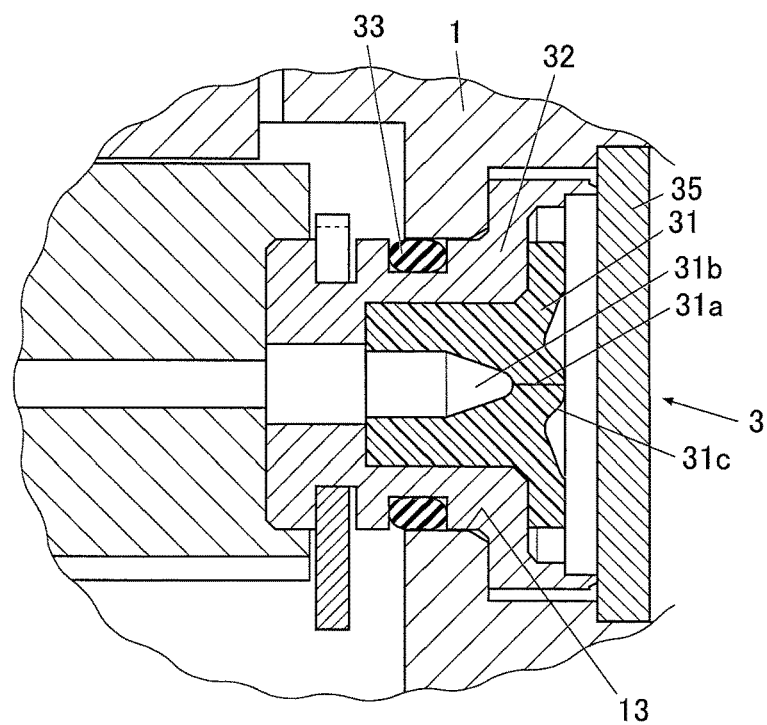

ELECTRONIC DEVICE, WEARABLE DEVICE, PRESSURE REGULATOR VALVE AND METHOD FOR MANUFACTURING PRESSURE REGULATOR VALVE

CROSS-REFERENCE TO RELATED APPLICATIONS

This application is based upon and claims the benefit of priority under 35 U.S.C. 119 of Japanese Patent Applications No. 2015-134195 filed on Jul. 3, 2015 and No. 2016-108206 filed on May 31, 2016, the entire disclosure of which, including the descriptions, claims, drawings and abstracts, is incorporated herein by reference in its entirety.

BACKGROUND OF THE INVENTION

1. Field of the Invention

The present invention relates to an electronic device, a wearable device, a pressure regulator valve and a method for manufacturing a pressure regulator valve.

2. Description of the Related Art

As described in Japanese Patent Application Publications No. 5-172956 and No. 6-27254, there is well known a watch provided with an internal pressure regulator valve which reduces internal pressure when a button is pressed.

Further, as described in Japanese Patent Application Publication No. 2006-101505, there is also well known a watch having an information communication function, called smartwatch.

BRIEF SUMMARY OF THE INVENTION

According to a first aspect of the present invention, there is provided an electronic device including: a housing; and an internal pressure regulator valve including a valve body of flexible material having: a valve hole through which gas is released to outside; and a hollow which is continuous with the valve hole and opens into the housing.

According to a second aspect of the present invention, there is provided a wearable device including: an electronic circuit; a battery; a wireless communication member; a waterproof microphone provided with a waterproof vibration film; a housing; and an internal pressure regulator valve including a valve body of flexible material having: a valve hole through which gas is released to outside; and a hollow which is continuous with the valve hole and opens into the housing.

According to a third aspect of the present invention, there is provided a pressure regulator valve including: a valve body of flexible material having: a valve hole through which gas is delivered from one side to another side; and a hollow which is continuous with the valve hole and opens to the one side.

According to a fourth aspect of the present invention, there is provided a method for manufacturing a pressure regulator valve, including: molding a valve body having a hollow at a center part from flexible material, the hollow opening to one side; introducing a needle-shaped member into the center part of the valve body along the hollow; and performing a hole forming process with the needle-shaped member on the center part of the valve body, thereby forming a valve hole which is continuous with the hollow.

According to a fifth aspect of the present invention, there is provided an electronic device including: a housing; and an internal pressure regulator valve which opens, thereby releasing gas in the housing to outside, when (i) an internal pressure of the housing is higher than an external pressure and (ii) a difference between the internal pressure and the external pressure is equal to or larger than a first predetermined difference.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is an enlarged cross sectional view taken along the B-B line shown in FIG. 1 and shows the configuration of an internal pressure regulator valve.

FIG. 4 shows the internal pressure regulator valve shown in FIG. 3 in a state in which the external pressure is higher than the internal pressure of the housing of the wearable terminal.

DETAILED DESCRIPTION OF THE INVENTION

Embodiments of the present invention will be explained with reference to the drawings.
(Embodiment)

Figure 1:
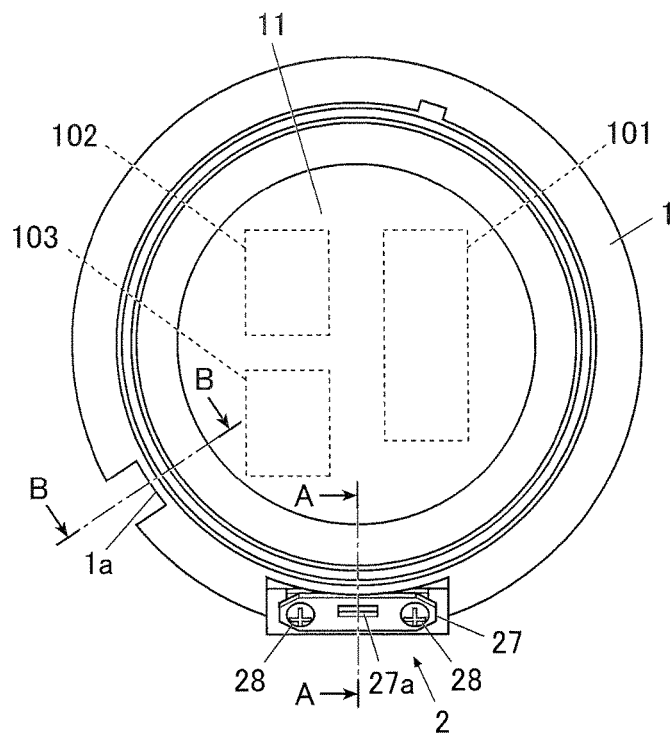
FIG. 1 is a schematic plan view of a wearable terminal and shows the configuration of an embodiment of an electronic device to which the present invention is applied.
Figure 2:
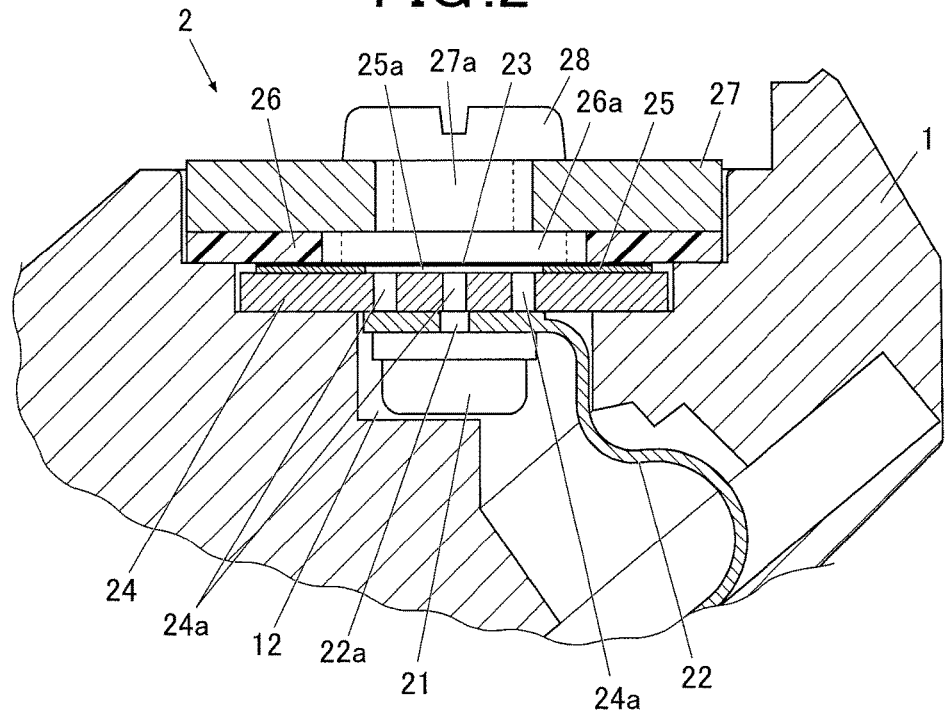
FIG. 2 is an enlarged cross sectional view taken along the A-A line shown in FIG. 1 and shows the configuration of a waterproof microphone.

FIG. 1 shows a wearable device (smartwatch) to schematically show the configuration of an embodiment of an electronic device to which the present invention is applied. FIG. 2 shows an enlarged cross section taken along the A-A line shown in FIG. 1. FIG. 3 shows an enlarged cross section taken along the B-B line shown in FIG. 1. In the drawings, "1" represents a housing, "2" represents a waterproof microphone unit, and "3" represents an internal pressure regulator valve (a pressure regulator valve) unit.

As shown in FIG. 1, the waterproof microphone unit 2 is attached to the outer circumference of the watch-type housing 1 at the six o'clock position, and the internal pressure regulator valve unit 3 is attached to deep inside a notched part 1a formed at the eight o'clock position.

The housing 1 is provided with a display unit 11, and houses an electronic circuit 102, a lithium ion battery 101, a wireless communication member 103 and so forth.

In the waterproof microphone unit 2, as shown in FIG. 2, a microphone element 21 is engaged with (fitted into) a fitting hole 12 formed in the housing 1. The microphone element 21 is mounted on the tip part of a flexible substrate 22 connected to a not-shown circuit substrate. In the tip part of the flexible substrate 22, a small hole 22a is formed to transmit sound emitted from the microphone element 21.

On the tip part of the flexible substrate 22 on the microphone element 21, a plate-shaped deformation preventing member 24 is placed. The deformation preventing member 24 prevents deformation of a waterproof vibration film 23. The waterproof vibration film 23 is constituted of, for example, a film having high stiffness, low water absorbability, and high sound transmittance, thereby well transmitting vibration, and is thereby configured to be impermeable to water.

The deformation preventing member 24 is engaged with (fitted into) the fitting hole 12 of the housing 1. In the deformation preventing member 24, small holes 24a are formed to transmit sound emitted from the microphone element 21.

On the deformation preventing member 24, the waterproof vibration film 23 is placed through a thin-plate-shaped spacer 25. The waterproof vibration film 23 is attached to the deformation preventing member 24, having sufficient clearance to the deformation preventing member 24 thanks to an opening 25a formed at the center part of the spacer 25.

On the waterproof vibration film 23, a waterproof member 26 is placed. The waterproof member 26 is a ring-shaped and plate-shaped gasket having an opening 26a at the center part thereof. The waterproof member 26 is attached to the waterproof vibration film 23 in such a way as to overlap both the periphery of the waterproof vibration film 23 and the housing 1. The center part of the waterproof vibration film 23 is positioned at the opening 26a of the waterproof member 26.

On the waterproof member 26, an exterior member 27 constituted of a metal plate is placed. The exterior member 27 has a slit-shaped sound emission hole 27a formed at the center part thereof. The exterior member 27 is attached to the housing 1 with screws 28. The exterior member 27 compresses the waterproof member 26, and waterproofness between the housing 1 and the waterproof microphone unit 2 is maintained.

The internal pressure regulator valve unit 3 has, as shown in FIG. 3, a micro valve hole 31a as a through hole formed at the center part of an approximately-columnar valve body 31 composed of flexible material, such as rubber material. If the rubber material is too hard, air hardly escapes from the housing 1. Hence, rubber material having a hardness at which the internal pressure reduces properly is selected for the valve body 31.

As time passes, the rubber material may change its physical properties, for example, it may soften, and/or cause the micro valve hole 31a to irreversibly close (i.e., to be blocked up and accordingly not to reopen), so that the air hardly escapes from the micro valve hole 31a. Hence, the rubber material contains oil to let the air properly escape even over time.

At the center part of the valve body 31, a tapered hollow 31b and a projection 31c are formed. The tapered hollow 31b is continuous with the inner end of the micro valve hole 31a and opens into the housing 1. The projection 31c projects outward to be domed, containing the outer end of the micro valve hole 31a.

This valve body 31 is attached to an approximately-cylindrical metal valve case 32.

The maximum outer diameter of the approximately-cylindrical valve case 32 is, for example, about 5 mm to 6 mm, and the length of the micro valve hole 31a of the valve body 31 is, for example, about 0.4 mm to 0.5 mm.

Here, a method for manufacturing an internal pressure regulator valve (a pressure regulator valve) including the valve body 31 and the valve case 32 is described.

First, the valve case 32 is set in a not-shown mold, and rubber material as the flexible material is injected thereinto and vulcanized, whereby the valve body 31 is molded in the valve case 32 to be integrated.

This ensures waterproofness between the valve body 31 and the valve case 32, and also makes fittingness of the internal pressure regulator valve into a fitting hole 13 of the housing 1 excellent.

Next, into the center part of the valve body 31, which is molded to be integrated with the valve case 32, a not-shown ultra-fine pin (needle-shaped member) is inserted to pierce, thereby performing a hole forming process to form the micro valve hole 31a. As shown in FIG. 3, in the valve body 31, the tapered hollow 31b is formed with the center part on the inner side of the valve body 31 as the tip. When the ultra-fine pin is inserted, the pin is inserted into the center part of the valve body 31 along the hollow 31b, whereby the micro valve hole 31a can be easily formed at the center part of the valve body 31.

Thus, the micro valve hole 31a can be easily formed in the valve body 31 by post-processing.

Then, as shown in FIG. 3, the valve case 32 is fitted into the fitting hole 13 formed in the housing 1. That is, a waterproof O-ring 33 is engaged with a groove 32a formed in the outer circumference of the valve case 32. This O-ring 33 waterproofs the space between the fitting hole 13 of the housing 1 and the valve case 32.

In addition, an E-ring in the shape of a segment of a circle as a fall preventing member 34 is engaged with a groove 32b formed in the outer circumference of the valve case 32 at the end part of the valve case 32. The fall preventing member 34 prevents the valve case 32 from falling from the fitting hole 13.

In the above-described waterproof wearable device including the watch-type housing 1 provided with the waterproof microphone unit 2 and the internal pressure regulator valve unit 3, the waterproof microphone unit 2 is covered with a not-shown cover, and the notched part 1a in which the internal pressure regulator valve unit 3 is housed is covered with a dust entering preventing cover 35 having a gas escape hole part.

When the housing 1 is put on the left wrist, the waterproof microphone unit 2 is located at the six o'clock position, and the internal pressure regulator valve unit 3 is located deep inside the notched part 1a formed at the eight o'clock position. This protects the waterproof microphone unit 2 and the internal pressure regulator valve unit 3 from being scratched.

Next, operation of the internal pressure regulator valve unit 3 is described.

When the internal pressure of the housing 1 becomes, for example, 1 atm lower than the external pressure, in the internal pressure regulator valve unit 3, because the projection 31c is formed to be domed toward the outside of the valve body 31, the projection 31c, which projects outward, and its surrounding part elastically deform with the external pressure in a direction to be pressed inward as shown in FIG. 4. Thus, as compared with the case of absence of the projection 31c, with the tightening force increased by presence of the projection 31c, the micro valve hole 31a closes for sure. This blocks liquid from entering the housing 1 from the outside and can maintain waterproofness and airtightness at excellent levels.

The valve body 31 can even deal with an external pressure of, for example, 5 atm or more.

Figure 5:
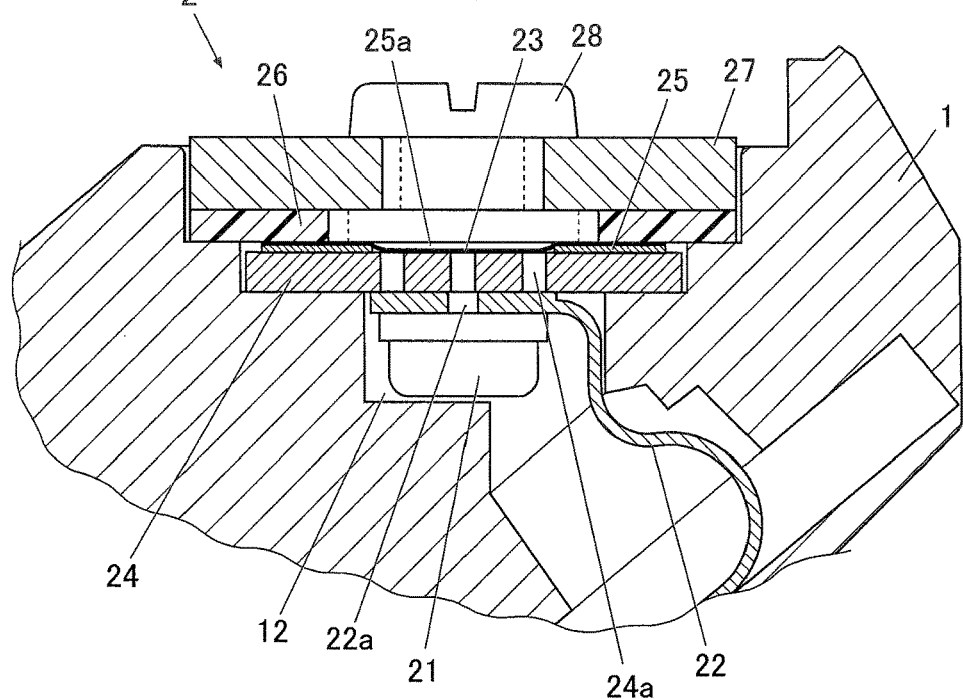
FIG. 5 shows the waterproof microphone shown in FIG. 2 in the state in which the external pressure is higher than the internal pressure.

At the time, in the waterproof microphone unit 2, as shown in FIG. 5, the waterproof vibration film 23 elastically deforms inward with the external pressure, but the deformation preventing member 24 prevents plastic deformation and breakage of the waterproof vibration film 23.

Thus, at the time when the external pressure increases, the waterproof vibration film 23 vibrates while the deformation preventing member 24 controls elastic deformation of the waterproof vibration film 23 and thereby can transmit and release sound emitted from the microphone element 21 to the outside.

As described above, when the internal pressure of the housing 1 is lower than the external pressure, the internal pressure regulator valve unit 3 closes, thereby blocking liquid from entering the housing 1 from the outside.

Alternatively, when the internal pressure of the housing 1 is lower than the external pressure, and the difference between the internal pressure of the housing 1 and the external pressure is equal to or larger than a predetermined amount (a second predetermined difference, e.g., 1 atm), the internal pressure regulator valve unit 3 closes, thereby blocking liquid from entering the housing 1 from the outside.

Figure 6:
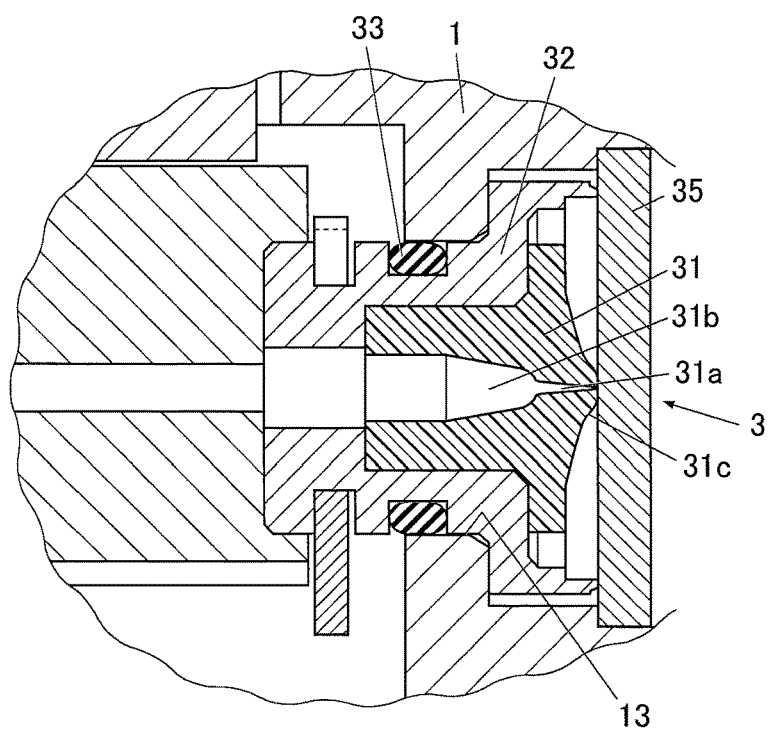
FIG. 6 shows the internal pressure regulator valve shown in FIG. 3 in a state in which the internal pressure is 1 atm or more higher than the external pressure.

On the other hand, when the internal pressure of the housing 1 become, for example 1 atm higher than the external pressure due to heat generation by the electronic circuit, expansion of the lithium ion battery, gas generation by the lithium ion battery or the like in the housing 1, in the internal pressure regulator valve unit 3, as shown in FIG. 6, spreading force is generated by the internal pressure in the tapered hollow 31b which opens on the inner side of the valve body 31.

With this, the micro valve hole 31a and the projection 31c are pressed to spread, and the internal pressure (gas) can be discharged from the micro valve hole 31a to the outside.

Because of presence of the tapered hollow 31b, which opens on the inner side of the valve body 31, the spreading force to spread the tapered hollow 31b is generated by the internal pressure, and the micro valve hole 31a is pressed to spread (open) more properly, as compared with the case of absence of the projection 31c.

Figure 7:
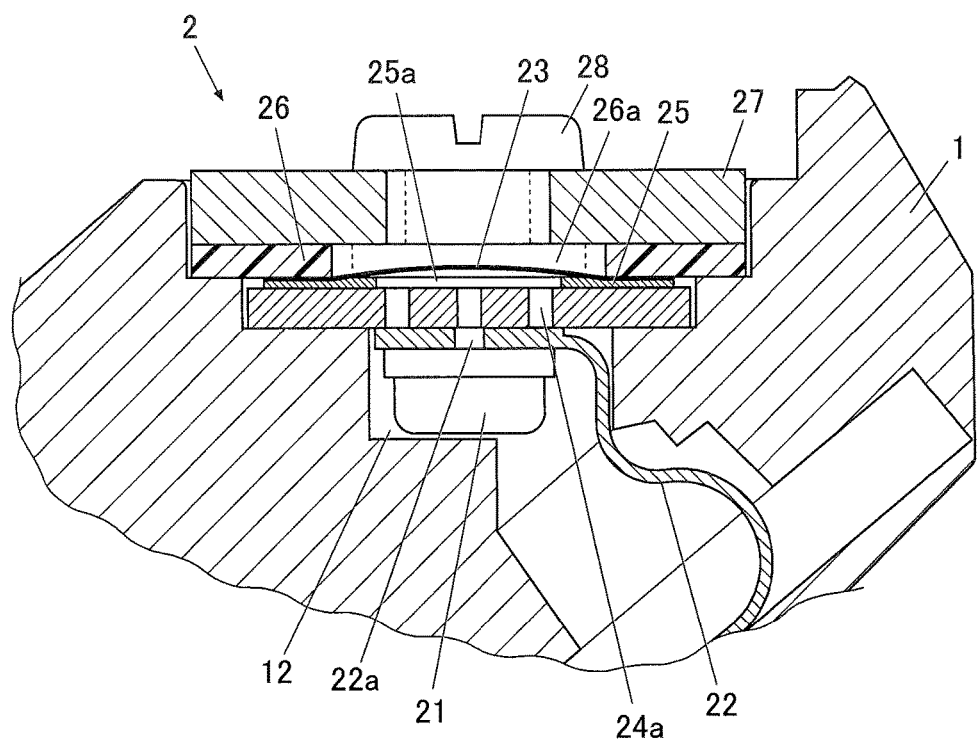
FIG. 7 shows the waterproof microphone shown in FIG. 2 in the state in which the internal pressure is 1 atm or more higher than the external pressure.

At the time, in the waterproof microphone unit 2, as shown in FIG. 7, the waterproof vibration film 23 elastically deforms outward with the internal pressure in such a way as to swell up from the opening 26a formed at the center part of the waterproof member 26. However, by the above-described operation of the internal pressure regulator valve unit 3, a pressure which is 1 atm or more higher than the external pressure is not applied to the waterproof vibration film 23. This prevents breakage of the waterproof vibration film 23.

Thus, at the time when the internal pressure increases, the waterproof vibration film 23 vibrates without interfering with other members or the like and thereby can transmit and release sound emitted from the microphone element 21 to the outside.

As described above, when the internal pressure of the housing 1 is higher than the external pressure, the internal pressure regulator valve unit 3 opens, thereby releasing gas in the housing 1 to the outside.

Alternatively, when the internal pressure of the housing 1 is higher than the external pressure, and the difference between the internal pressure of the housing 1 and the external pressure is equal to or larger than a predetermined amount (a first predetermined difference, e.g., 1 atm), the internal pressure regulator valve unit 3 opens, thereby releasing gas in the housing 1 to the outside.

The length of the projection 31c in its projecting direction is related to stability of the difference between the internal pressure and the external pressure at which air escapes from the housing 1 to the outside and the difference between the internal pressure and the external pressure at which liquid enters the housing 1 from the outside. If the length of the projection 31c is too long, as time passes, the difference between the internal pressure and the external pressure at which the valve opens, thereby letting air escape from the housing 1 to the outside, and the difference between the internal pressure and the external pressure at which the valve closes, thereby blocking liquid from entering the housing 1 from the outside, change. This makes the internal pressure regulator valve unit 3 not operate properly. Hence, the length of the projection 31c needs to be a proper length based on the size of the valve body 31 and/or hardness of the rubber material of the valve body 31. In the embodiment, the length of the projection 31c is set at around 0.4 mm to 0.8 mm.

Thus, in a waterproof wearable device provided with the waterproof microphone unit 2 having the waterproof vibration film 23, the waterproof microphone unit 2 having the waterproof vibration film 23 can be used even under the environment where the internal pressure of the housing 1 becomes 1 atm or more higher than the external pressure by being provided with the internal pressure regulator valve unit 3 having the automatic internal pressure regulating function.

Further, in the waterproof wearable device provided with a lithium ion battery, breakage of components thereof caused by expansion of the battery, gas generation by the battery or the like can be prevented.

In the embodiment, when the internal pressure of the housing 1 is lower than the external pressure, and the difference between the internal pressure of the housing 1 and the external pressure is equal to or larger than 1 atm, the internal pressure regulator valve unit 3 closes, thereby blocking liquid from entering the housing 1 from the outside, and when the internal pressure of the housing 1 is higher than the external pressure, and the difference between the internal pressure of the housing 1 and the external pressure is equal to or larger than 1 atm, the internal pressure regulator valve unit 3 opens, thereby releasing gas in the housing 1 to the outside. However, this is not a limitation. The differences between the internal pressure and the external pressure at which liquid is blocked from entering the housing 1 from the outside and at which gas is discharged from the housing 1 to the outside can be freely set by a user, and the internal pressure regulator valve unit 3 can be configured with the set differences.

The valve body 31 is configured to close the micro valve hole 31a for sure, thereby blocking liquid from entering the housing 1 from the outside, with the tightening force of the rubber material (i) when the internal pressure of the housing 1 balances with the external pressure, (ii) when the internal pressure of the housing 1 is lower than the external pressure, and the difference between the internal pressure and the external pressure is smaller than the second predetermined difference, and (iii) when the internal pressure of the housing 1 is higher than the external pressure, and the difference between the internal pressure and the external pressure is smaller than the first predetermined difference. Further, a sheet member permeable to air but not to water may be placed on the dust entering preventing cover 35 in such a way as to close the gas escape hole part thereof.

As described above, the waterproof wearable device of the embodiment includes the internal pressure regulator valve unit 3 having the automatic internal pressure regulating function and thereby can prevent itself, without user operation, from being damaged or broken even if the internal pressure of the housing 1 becomes 1 atm or more higher than the external pressure.

In the embodiment, the internal pressure regulator valve unit 3 is configured to block liquid from entering the housing 1 from the outside. However, the internal pressure regulator valve unit 3, to be specific, the valve body 31, may be formed to block gas from entering the housing 1 from the outside too.

Further, the internal pressure regulator valve unit 3 may be configured to let gas enter the housing 1 from the outside or discharge gas from the housing 1 to the outside such that the internal pressure of the housing 1 becomes a predetermined atmospheric pressure, such as the atmospheric pressure under the normal condition (e.g., 1 atm).

Further, in the embodiment, the internal pressure regulator valve unit 3 is configured to block liquid from entering the housing 1 from the outside when the internal pressure of the housing 1 becomes 1 atm (or more) lower than the external pressure, and discharge gas from the housing 1 to the outside when the internal pressure of the housing 1 becomes 1 atm (or more) higher than the external pressure. However, this is not a limitation. Hence, the internal pressure regulator valve unit 3 may be configured to block liquid from entering the housing 1 from the outside when the internal pressure of the housing 1 becomes 1.1 atm (or more) lower than the external pressure, and discharge gas from the housing 1 to the outside when the internal pressure of the housing 1 becomes 1.2 atm (or more) higher than the external pressure. Needless to say, the differences between the internal pressure and the external pressure at which liquid is blocked from entering the housing 1 from the outside and at which gas is discharged from the housing 1 to the outside can be freely set by a user, and the internal pressure regulator valve unit 3 can be configured with the set differences.

(Modifications)

In the above embodiment, the watch-type wearable device, called smartwatch, is described. However, the present invention is not limited thereto and hence may be an electronic device, for example, another information device, such as a cellular phone.

Further, in the embodiment, the waterproof microphone unit and the internal pressure regulator valve unit are used. However, as long as the waterproof microphone and the internal pressure regulator valve are provided, they do not need to be configured as units.

Still further, the shapes of the housing and the valve body, the positions of the waterproof microphone and the internal pressure regulator valve, and so forth can be decided appropriately. Yet further, the specific and detailed structures of the waterproof microphone and so forth can also be modified appropriately as a matter of course.

In the above, several embodiment (s)/modification(s) of the present invention are described. However, the scope of the present invention is not limited thereto and includes the scope of claims attached below and the scope of its equivalents.

What is claimed is:

1. An electronic device comprising:
    a housing; and
    an internal pressure regulator valve comprising:
        a valve body of flexible material, wherein the valve body includes:
            a valve hole through which gas is released to outside; and
            a hollow which is continuous with the valve hole and opens into the housing;
        a valve case configured to house the valve body; and
        a waterproof ring through which the valve case is fitted into a fitting hole formed in the housing.

2. The electronic device according to claim 1,
    wherein the valve body comprises a projection which projects to the outside, and
    wherein the projection includes an outer end of the valve hole.

3. The electronic device according to claim 1,
    wherein the valve body is configured such that, when an internal pressure of the housing is higher than an external pressure, the internal pressure generates a spreading force that elastically deforms the valve body to spread the hollow to thereby open the valve hole to release the gas to the outside.

4. The electronic device according to claim 3,
    wherein the valve body is configured such that, when (i) the internal pressure of the housing is higher than the external pressure and (ii) a difference between the internal pressure and the external pressure is equal to or larger than a first predetermined difference, the internal pressure generates the spreading force that elastically deforms the valve body to spread the hollow to thereby open the valve hole to release the gas to the outside.

5. The electronic device according to claim 2,
    wherein the valve body is configured such that, when an internal pressure of the housing is lower than an external pressure, the external pressure generates a tightening force that elastically deforms the projection to close the outer end of the valve hole to thereby block liquid from entering the housing from the outside.

6. The electronic device according to claim 5,
    wherein the valve body is configured such that, when (i) the internal pressure of the housing is lower than the external pressure and (ii) a difference between the internal pressure and the external pressure is equal to or larger than a predetermined difference, the external pressure generates the tightening force that elastically deforms the projection to close the outer end of the valve hole to thereby block the liquid from entering the housing from the outside.

7. The electronic device according to claim 2,
    wherein the valve body is configured such that, when (i) an internal pressure of the housing is higher than an external pressure and (ii) a difference between the internal pressure and the external pressure is equal to or larger than a first predetermined difference, the internal pressure generates a spreading force that elastically deforms the valve body to spread the hollow to thereby open the valve hole to release the gas to the outside, and
    wherein the valve body is configured such that, when (i) the internal pressure of the housing is lower than the external pressure and (ii) the difference between the internal pressure and the external pressure is equal to or larger than a second predetermined difference, the external pressure generates a tightening force that elastically deforms the projection to close the outer end of the valve hole to thereby block liquid from entering the housing from the outside.

8. The electronic device according to claim 1, further comprising a waterproof microphone comprising a waterproof vibration film,
    wherein the valve body is configured such that, when an internal pressure of the housing is higher than an external pressure, the internal pressure generates a spreading force that elastically deforms the valve body to spread the hollow to thereby open the valve hole to release the gas to the outside to decrease deformation of the waterproof vibration film by the internal pressure.

9. The electronic device according to claim 1,
wherein the internal pressure regulator valve further comprises a fastener configured to prevent the valve case from falling from the fitting hole, and
wherein the fastener is engaged with a groove formed in an outer circumference of the valve case.

10. A wearable device comprising:
a housing;
an electronic circuit arranged in the housing;
a battery arranged in the housing;
a wireless communication member arranged in the housing, wherein operation of one or more of the electronic circuit, the battery and the wireless communication member increases an internal pressure of the housing;
a waterproof microphone provided with a waterproof vibration film, wherein the waterproof microphone is arranged in the housing; and
an internal pressure regulator valve comprising:
    a valve body of flexible material, wherein the valve body includes:
        a valve hole through which gas is released to outside; and
        a hollow which is continuous with the valve hole and opens into the housing, wherein the internal pressure generates a spreading force that elastically deforms the valve body to spread the hollow to thereby open the valve hole to release the gas to the outside to decrease deformation of the waterproof vibration film by the internal pressure;
    a valve case configured to house the valve body; and
    a waterproof ring through which the valve case is fitted into a fitting hole formed in the housing.

11. A pressure regulator valve comprising:
a valve body of flexible material, wherein the valve body includes:
    a valve hole through which gas is released to outside of a housing; and
    a hollow which is continuous with the valve hole and opens into the housing;
a valve case configured to house the valve body; and
a waterproof ring through which the valve case is fitted into a fitting hole formed in the housing.

12. The pressure regulator valve according to claim 11,
wherein the valve body comprises a projection which projects to the outside, and
wherein the projection includes an outer end of the valve hole.

13. The pressure regulator valve according to claim 12,
wherein the valve body is configured such that, when (i) an internal pressure of the housing is higher than an external pressure and (ii) a difference between the internal pressure and the external pressure is equal to or larger than a first predetermined difference, the internal pressure generates a spreading force that elastically deforms the valve body to spread the hollow to thereby open the valve hole to release the gas to the outside, and
wherein the valve body is configured such that, when (i) the internal pressure of the housing is lower than the external pressure and (ii) the difference between the internal pressure and the external pressure is equal to or larger than a second predetermined difference, the external pressure generates a tightening force that elastically deforms the projection to close the outer end of the valve hole to thereby block liquid from entering the housing from the outside.

14. A method for manufacturing a pressure regulator valve, comprising:
molding a valve body having a hollow at a center part from flexible material, the hollow opening to one side;
introducing a needle-shaped member into the center part of the valve body along the hollow; and
performing a hole forming process with the needle-shaped member on the center part of the valve body, thereby forming a valve hole which is continuous with the hollow.

15. An electronic device comprising:
a housing; and
an internal pressure regulator valve comprising:
    a valve body of flexible material, wherein the valve body includes a valve hole and is configured such that, when (i) an internal pressure of the housing is higher than an external pressure and (ii) a difference between the internal pressure and the external pressure is equal to or larger than a first predetermined difference, the internal pressure generates a spreading force that elastically deforms the valve body to thereby open the valve hole to release gas to an outside of the housing;
    a valve case configured to house the valve body; and
    a waterproof ring through which the valve case is fitted into a fitting hole formed in the housing.

16. The electronic device according to claim 15,
wherein the valve body is configured such that, when the internal pressure of the housing is lower than the external pressure, the external pressure generates a tightening force that elastically deforms the valve body to close the valve hole to thereby block liquid from entering the housing from the outside.

17. The electronic device according to claim 16,
wherein the valve body is configured such that, when (i) the internal pressure of the housing is lower than the external pressure and (ii) the difference between the internal pressure and the external pressure is equal to or larger than a second predetermined difference, the external pressure generates the tightening force that elastically deforms the valve body to close the valve hole to thereby block the liquid from entering the housing from the outside.

\* \* \* \* \*